United States Patent [19]
Hayes

[11] 3,898,173
[45] *Aug. 5, 1975

[54] FOUR-STEP PROCEDURE FOR REGENERATING A CARBON-CONTAINING DEACTIVATED BIMETALLIC ACIDIC CATALYST

[75] Inventor: John C. Hayes, Palatine, Ill.

[73] Assignee: Universal Oil Products Company, Des Plaines, Ill.

[ * ] Notice: The portion of the term of this patent subsequent to Jan. 15, 1991, has been disclaimed.

[22] Filed: Oct. 2, 1973

[21] Appl. No.: 402,872

Related U.S. Application Data

[63] Continuation-in-part of Ser. No. 175,342, Aug. 26, 1971, Pat. No. 3,785,996, and a continuation-in-part of Ser. No. 179,156, Sept. 9, 1971, Pat. No. 3,773,686, which is a continuation-in-part of Ser. No. 797,272, Feb. 6, 1969, Pat. No. 3,634,292.

[52] U.S. Cl. .................. 252/415; 208/140; 252/419
[51] Int. Cl. ...................... B01j 11/18; C10g 35/06
[58] Field of Search ............. 252/415, 419; 208/140

[56] References Cited
UNITED STATES PATENTS

| | | | |
|---|---|---|---|
| 2,892,770 | 6/1959 | Coley et al. | 208/140 |
| 3,496,096 | 2/1970 | Kluksdahl | 208/140 |
| 3,531,543 | 9/1970 | Clippinger et al. | 252/466 PT |
| 3,558,479 | 1/1971 | Jacobson et al. | 208/139 |
| 3,567,656 | 3/1971 | Mitsche | 252/466 PT |
| 3,578,582 | 5/1971 | Jacobsch | 208/140 |
| 3,634,292 | 1/1972 | Hayes | 252/415 |
| 3,649,565 | 3/1972 | Wilhelm | 252/466 PT |
| 3,654,182 | 4/1972 | Hayes | 252/415 |
| 3,658,691 | 4/1972 | Keith et al. | 208/139 |
| 3,670,044 | 6/1972 | Drehman et al. | 208/138 |
| 3,751,379 | 8/1973 | Hayes | 252/415 |
| 3,764,557 | 10/1973 | Kluksdahl | 252/415 |
| 3,773,686 | 11/1973 | Hayes | 252/415 |
| 3,785,996 | 1/1974 | Hayes | 252/415 |
| 3,803,052 | 4/1974 | Hayes | 252/415 |

Primary Examiner—Winston A. Douglas
Assistant Examiner—P. E. Konopka
Attorney, Agent, or Firm—James R. Hoatson, Jr.; Thomas K. McBride; William H. Page, II

[57] ABSTRACT

A deactivated hydrocarbon conversion catalyst, which is a combination of catalytically effective amounts of a platinum group component, a Group IVA metallic component, and a halogen component with a porous carrier material and which has been deactivated by deposition of carbonaceous materials thereon during a previous contacting with a hydrocarbon charge stock at an elevated temperature, is regenerated by the sequential steps of: (a) burning carbon therefrom at a relatively low temperature with a substantially sulfur compound-free gas stream containing $H_2O$ and a relatively small amount of $O_2$; (b) treating the resulting partially regenerated catalyst at a relatively higher temperature with a substantially sulfur compound-free gas stream containing a halogen or a halogen-containing compound, $H_2O$ and a relatively higher amount of $O_2$; (c) purging $O_2$ and $H_2O$ from contact with the resulting catalyst; and, (d) subjecting the resulting catalyst to contact with a dry and sulfur compound-free hydrogen stream. Key features of the disclosed method are: (1) presence of water in the gas stream used in all steps except the reduction step; (2) careful control of the temperature used during each step; (3) adjustment of the halogen content of the catalyst immediately after the carbon-burning step and prior to the reduction step; (4) careful control over the composition of the gas streams used in the various steps thereof; and, (5) exclusion of sulfur compounds from all gas streams utilized.

19 Claims, No Drawings 3,898,173

FOUR-STEP PROCEDURE FOR REGENERATING A CARBON-CONTAINING DEACTIVATED BIMETALLIC ACIDIC CATALYST

CROSS-REFERENCES TO RELATED APPLICATIONS

This application is a continuation-in-part of my prior, copending application Ser. No. 175,342, filed Aug. 26, 1971 and now U.S. Pat. No. 3,785,996, Jan. 15, 1974, and of my prior, copending application Ser. No. 179,156 filed Sept. 9, 1971, now U.S. Pat. No. 3,773,686, Nov. 20, 1973, both of these applications being in turn continuations-in-part of my prior application Ser. No. 797,272, filed Feb. 6, 1969 and now U.S. Pat. No. 3,634,292, all of the teachings of these prior applications being specifically incorporated herein by reference.

The subject of the present invention is a 4-step method for regenerating a coke-deactivated hydrocarbon conversion catalyst comprising a combination of catalytically effective amounts of a platinum group component, a Group IVA metallic component and a halogen component with a porous carrier material. More specifically, the present invention is a method for regenerating a deactivated hydrocarbon conversion catalyst, comprising a combination of catalytically effective amounts of platinum, tin or germanium or lead, and halogen with an alumina carrier material, where the catalyst has been deactivated by the deposition of carbonaceous materials thereon during a previous contacting with a hydrocarbon charge stock at an elevated temperature. In essence, the present invention provides a specific sequence of carbon-burning and catalyst treatment steps designed to result in a regenerated catalyst possessiing activity, selectivity, and stability characteristics which are comparable to those observed with the fresh undeactivated catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as one or more of the transition metals or compounds of the transition metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An exammple of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an hydroisomerization process wherein a hydrocarbon fraction which is relatively rich in straight-chain paraffin components is contacted at isomerization conditions with a dual-function catalyst in the presence of hydrogen to produce an output stream rich in isoparaffin compounds.

Regardless of the reaction involved or the particular process involved, it is of critical importance that the dual-function catalyst exhibit not only the capability to initially perform the specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used — that is, the temperature, pressure, contact time, and presence of diluents such as $H_2$; (2) selectivity refers to the amount of the desired product and/or products obtained expressed as a function of the amount of hydrocarbons charged or converted; (3) stability refers to the rate of change with time of the activity and selectivity parameters — obviously the smaller rate implying the more stable catalyst. In a reforming process, for example, activity commonly refers to the amount of conversion that takes place for a given charge stock at a specified severity level and is typically measured by octane number of the $C_5+$ product stream; selectivity refers to the amount of $C_5+$ yield, relative to the amount of the charge stock, that is obtained at a particular activity or severity level; and stability is typically equated to the rate of change with time of activity, as measured by octane number of $C_5+$ product, and of selectivity, as measured by $C_5+$ yield. Actually, the last statement is not strictly correct beause generally a continuous reforming process is run to produce a constant octane $C_5+$ product with severity level being continuously adjusted to attain this result; and, furthermore, the severity level is for this process usually varied by adjusting the conversion temperature in the reaction zone so that, in point of fact, the rate of change of activity finds response in the rate of change of conversion temperature, and changes in this last parameter are customarily taken as indicative of activity stability.

As is well known to those skilled in the hydrocarbon conversion art, the principal cause of observed deactivation or instability of these dual-function catalysts when they are used in a hydrocarbon conversion reaction is associated with the formation of coke or carbonaceous materials on the surface of the catalyst during the course of the reaction. More specifically, the conditions utilized in these hydrocarbon conversion processes typically result in the formation of heavy, black, solid or semi-solid carbonaceous material which deposits on the surface of the catalyst and gradually reduces its activity by shielding its active sites from the reactants. Recently, there has been developed a new dual-function, bimetallic catalytic composite which possesses improved activity, selectivity, and stability characteristics when it is employed in a process for the conversion of hydrocarbons of the type which has heretofore utilized dual-function catalytic composites such as processes for isomerization, dehydrogenation, hydrogenation, alkylation, transalkylation, dealkylation, cyclization, dehydrocyclization, cracking, hydrocracking, reforming and the like processes. In particular, it has been established that a bimetallic catalyst comprising a combination of catalytically effective amounts of a platinum group component, a Group IVA metallic component and a halogen component with a porous carrier material, can enable the performance of hydrocarbon conversion processes that have traditionally utilized dual-function catalysts to be substantially improved. For example, it has been demonstrated that the overall performance characteristics of a catalytic reforming process can be sharply improved by the use of this recently developed, bimetallic catalytic composite. Not unexpectedly, the deactivation of this bimetallic, dual-function hydrocarbon conversion catalyst occurs in much the same manner as for any other hydrocarbon conversion catalyst having a platinum group component when it is employed in the hydrocarbon conversion service. Accordingly, the principal mode of deactivation of this recently developed bimetallic catalyst is the deposition of coke, volatile hydrocarbons, and other carbonaceous material on the surface of the catalyst which eventually cover the catalytically active sites of the catalyst, thereby shielding them from the reactants or blocking access of the reactants to the sites. These deposits cause a gradual decline in activity and selectivity of the catalyst and a gradual loss of its capability to perform its intended functions. Depending somewhat on the performance requirements imposed on the process utilizing the bimetallic catalyst, at some point in time the catalyst becomes so clogged with carbonaceous materials that it either must be regenerated or discarded. Heretofore, substantial difficulty has been encountered in regenerating this recently developed bimetallic hydrocarbon conversion catalyst. More specifically, it has been ascertained that the application of conventional regeneration techniques which have heretofore been practiced in the art of regenerating monometallic, dual-function, platinum-containing hydrocarbon conversion catalysts, has not been successful in restoring the initial activity, selectivity, and stability characteristics of these bimetallic catalysts. Typically, the application of conventional carbon-burning procedure with oxygen-containing gases results in a regenerated catalyst having an extremely low activity and containing a reduced amount of halogen component. Attempts at restoring the initial level of halogen contained in the catalyst by well-known halogen adjustment procedures on the regenerated catalyst have been uniformly unsuccessful. Accordingly, the problem addressed by the present invention is the regeneration of a carbonaceous material-deactivated hydrocarbon conversion catalyst comprising a combination of catalytically effective amounts of a platinum group component, a Group IVA metallic component, and a halogen component with a porous carrier material.

The conception of the present invention was facilitated by my recognition that the adverse effects that have heretofore been commonly encountered in attempts to regenerate this bimetallic catalyst by conventional carbon-burning techniques were caused by a failure to carefully control the composition of the gas streams used in the various steps of the regeneration method coupled with a failure to carefully control the temperature used in each of the steps of the regeneration procedure. I have now found a specific sequence of steps which enable the successful regeneration of this recently developed bimetallic hydrocarbon conversion catalyst, and essential features of my method are: careful control of the temperature of the gas stream utilized in each of the steps, presence of water in all steps except the reduction step, adjustment of the halogen content of the catalyst immediately after removal of carbonaceous material from the catalyst but prior to the reduction step, careful control of the composition of the gas streams used in all steps, and exclusion of sulfur compounds from all gas streams utilized.

In one of my prior applications I disclosed a six-step regeneration procedure for this bimetallic catalyst where the catalyst after the carbon-burning step was subjected to a two-step oxygen-treating procedure prior to the halogen-treating step. The first oxygen-treating step was run at a high temperature, relative to the temperature used in the carbon-burning step, with a relatively small amount of $O_2$, and the second oxygen-treating step was run at higher temperature with a relatively larger amount of $O_2$. Now I have discerned that these two oxygen-treating steps can be eliminated from the procedure and the halogen-treating step can be performed immediately after the carbon-burning step if the temperature used in the halogen-treating step is at least 25° C. higher than that utilized in the carbon-burning step and if the amount of oxygen used in this halogen-treating step is substantially greater than that employed in the carbon-burning step. These modifications of the regeneration procedure disclosed in my prior application result in a substantial simplification of the procedure coupled with a marked decrease in the time required for regeneration.

It is, therefore, a principal object of the present invention to provide an improved method for regenerating a bimetallic hydrocarbon conversion catalyst comprising a combination of catalytically effective amounts of a platinum group component, a Group IVA metallic component, and a halogen component with a porous carrier material, when the catalyst has been deactivated by contact with a hydrocarbon charge stock at elevated temperatures. A corollary object is to provide a solution to the problem of regenerating these recently-developed, high-performance bimetallic catalysts which solution enables the substantial restoration of the activity, selectivity, and stability characteristics of the original catalyst. An overall object is to extend the total catalyst life of these recently-developed catalysts and to obtain more efficient and effective use of these catalysts during their active life. Another object is to provide a regeneration method which adjusts the halogen content of the bimetallic catalyst to a high level during the course of the regeneratioin procedure.

If brief summary, the present invention is, in one broad embodiment, a method for regenerating a deactivated hydrocarbon conversion catalyst comprising a combination of catalytically effective amounts of a platinum group component, a Group IVA metallic component, and a halogen component with a porous carrier material when the catalyst has been deactivated by deposition of carbonaceous materials thereon during a previous contacting with a hydrocarbon charge stock at an elevated temperature. The first step of the method is the carbon-burning step and it involves contacting the deactivated catalyst with a substantially sulfur compound-free gaseous mixture, comprising about 0.2 to about 3 mole % $O_2$ and about 0.02 to about 25 mole % $H_2O$, at combustion conditions, including a temperature of about 350° to about 500° C. and a pressure sufficient to maintain flow of the mixture through the catalyst, for a first period sufficient to substantially remove this carbonaceous material therefrom. Following this first step, the catalyst resulting therefrom is subjected to a halogen-treating step by contacting it with a substantially sulfur compound-free gaseous mixture comprising about 4 to about 25 mole % $O_2$, about 1 to about 30 mole % $H_2O$, and about 0.05 to about 5 mole % of a halogen or halogen-containing compound for a second period of at least about 0.5 to 10 hours at halogen-treating conditions including a temperature of at least about 25° C. higher than that utilized in the carbon-burning step and a pressure sufficient to maintain flow of the mixture through the catalyst. Thereafter, oxygen and water are purged from contact with the resulting catalyst by means of a dry gas stream. In the final step, the resulting dry catalyst is subjected to contact with a substantially water-free and sulfur compound-free hydrogen stream at reduction conditions, including a temperature of about 400° to about 600° C. and a pressure sufficient to maintain flow of the hydrogen stream through the catalyst, for a final period of at least about 0.5 to about 5 hours, thereby producing a regenerated hydrocarbon conversion catalyst having activity, selectivity, and stability characteristics comparable to those possessed initially by the fresh catalyst.

In brief summary, a preferred embodiment of the present invention is a method for regenerating a deactivated hydrocarbon conversion catalyst comprising a combination of catalytically effective amounts of a platinum component, a tin component, and a chlorine component with an alumina carrier material, when the catalyst has been deactivated by deposition of carbonaceous materials thereon during a previous contacting with a hydrocarbon charge stock at an elevated temperature. The first step of this preferred embodiment is the carbon-burning step and it involves contacting the deactivated catalyst with a substantially sulfur compound-free gaseous mixture comprising about 0.5 to about 2 mole % $O_2$ and about 0.1 to about 10 mole % $H_2O$, at combustion conditions, including a pressure of about 1 to about 7 atmospheres and a temperature of about 375° to about 475° C., for a first period sufficient to substantially remove said carbonaceous materials. Following this carbon-burning step, the catalyst resulting therefrom is subjected to contact with a substantially sulfur compound-free gaseous mixture comprising about 15 to about 25 mole % $O_2$, about 1 to about 10 mole % $H_2O$, and about 1 to about 4 mole % of chlorine or chlorine-containing compound for a second period of at least about 1 to about 5 hours at halogen treating conditions, including a temperature of about 500° to about 550° C. and a pressure of about 1 to 7 atmospheres. Thereafter, oxygen and water are purged from contact with the catalyst with a substantially water-free and oxygen-free gas stream. In the final step the resulting catalyst is subjected to contact with a substantially water-free and sulfur compound-free hydrogen stream at reduction conditions, including a temperature of about 450° to about 550° C. for a final period of at least about 0.5 to about 5 hours to produce a regenerated hydrocarbon conversion catalyst having activity, selectivity and stability characteristics comparable to those possessed initially by the fresh catalyst.

Other objects and embodiments of the present invention encompass further details about the deactivated catalyst that can be regenerated thereby, the conditions and reagents used in each step of the regeneration method, and the mechanics associated with each of these steps. These embodiments and objects will be hereinafter disclosed in the following detailed description of each of the essential and preferred steps of the present invention.

The present invention involves a regeneration procedure which is applicable to a bimetallic catalyst comprising a platinum group component, a Group IVA metallic component and a halogen component combined with a porous carrier material. Considering first the porous carrier material utilized in the type of catalysts regenerated by the present invention, the carrier material is typically a porous, adsorptive, high-surface area support having a surface area of about 25 to about 500 $m^2/g$. The porous carrier material should be relatively refractory to the conditions utilized in the hydrocarbon conversion process; examples of acceptable carriers are: (1) activated carbon, coke or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaoline, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) zeolitic crystalline aluminosilicates such as naturally occurring or synthetically prepared mordenite and/or faujasite, either in the hydrogen form or in a form which has been treated with multivalent cations; and, (6) combinations of one or more elements from these groups. The preferred porous carrier materials are refractory inorganic oxides, with best results usually obtained with an alumina carrier material. Suitable alumina materials are the crystalline aluminas known as the gamma-, eta-, and thetaaluminas, with gamma-alumina giving best results. In addition, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g/cc and surface area characteristics such that the average pore diameter is about 20 to 300 Angstroms, the pore volume is about 0.1 to about 1 cc/g and the surface area is about 100 to about 500 $m^2/g$. In general, excellent results are typically obtained with a gamma-alumina carrier material which is used in the form of spherical particles having: a relatively small diameter (i.e., typically about 1/16 inch), an apparent bulk density of about 0.5 g/cc, a pore volume of about 0.4 cc/g and a surface area of about 175 $m^2/g$.

One essential constituent of the type of catalyst regenerated by the present method is the Group IVA metallic component. By the use of the generic term "Group IVA metallic component" it is intended to cover the metals and compounds of the metals of Group IVA of the Periodic Table. More specifically, it is intended to cover: germanium and the compounds of germanium; tin and the compounds of tin; lead and the compounds of lead; and mixtures of these metals and/or compounds of metals. This Group IVA metallic component may be present in the catalytic composite as an elemental metal, or in a chemical combination with one or more of the other ingredients of the composite, or as a chemical compound of the Group IVA metal such as the oxide, sulfide, halide, oxyhalide, oxychloride, aluminate, and the like compounds. Based on the evidence currently available, it is believed that best results are obtained when the Group IVA metallic component exists in the final composite in an oxidation state above that of the elemental metal. Regardless of the state in which this component exists in the composite, it can be utilized therein in any amount which is catalytically effective with the preferred amount being about 0.01 to about 5 wt. % thereof, calculated on a carbonaceous material-free and elemental basis. The exact amount selected within this broad range is preferably determined as a function of the particular Group IVA species that is utilized. For instance, in the case where this component is lead, it is preferred to select the amount of this component from the low end of this range — namely, about 0.01 to about 1 wt. %. In the case where this component is tin, it is preferred to select from a relatively broader range of about 0.05 to about 2 wt. % thereof. And, in the preferred case, where the component is germanium the selection can be made from the full breadth of the stated range — specifically, about 0.01 to about 5 wt. %, with best results at about 0.05 to about 2 wt. %.

This Group IVA component may be incorporated in the composite in any suitable manner known to the art such as by coprecipitation or cogellation with the porous carrier material, ion exchange with the carrier material, or impregnation of the carrier material at any stage in its preparation. However, best results are believed to be obtained when the Group IVA component is uniformly distributed throughout the porous carrier material. One acceptable method of incorporating the Group IVA component into the catalytic composite involves cogelling the Group IVA component during the preparation of the preferred carrier material, alumina. This method typically involves the addition of a suitable soluble compound of the Group IVA metal of interest, such as tin tetrachloride, to the alumina hydrosol. The resulting mixture is then commingled with a suitable gelling agent such as a relatively weak alkaline reagent, and the resulting mixture is thereafter preferably gelled by dropping into a hot oil bath. After aging, drying and calcining the resulting particles there is obtained an intimate combination of the oxide of the Group IVA metal and alumina. One preferred method of incorporating this component into the composite involves utilization of a soluble, decomposable compound of the particular Group IVA metal of interest to impregnate the porous carrier material either before, during or after the carrier material is calcined. In general, the solvent used during this impregnation step is selected on the basis of its capability to dissolve the desired Group IVA compound without affecting the porous carrier material which is to be impregnated; ordinarily, good results are obtained when water is the solvent; thus the preferred Group IVA compounds for use in this impregnation step are typically water-soluble and decomposable. Examples of suitable Group IVA compounds are: germanium difluoride, germanium tetrafluoride, germanium dioxide, germanium monosulfide, tin dichloride, tin tetrachloride, tin dibromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IVA component is germanium, a preferred impregnation solution is germanium tetrachloride dissolved in anhydrous alcohol. In the case of tin, tin chloride dissolved in water is preferred. And in the case of lead, lead nitrate in water is preferred. Regardless of which impregnation solution is utilized the Group IVA component can be impregnated either prior to, simultaneously with, or after the platinum group component is added to the carrier material. Ordinarily, best results are obtained when this component is impregnated simultaneously with the platinum group component. Likewise, best results are ordinarily obtained when the Group IVA component is germanium or tin.

A second essential ingredient of the type of bimetallic catalyst which can be regenerated by the present method is the platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2 wt. % of the final catalytic composite, calculated on a carbonaceous material-free and elemental basis. Excellent results are obtained when the catalyst contains about 0.05 to about 1 wt. % of the platinum group metal. The preferred platinum group component is platinum or a compound of platinum, although good results are obtained when it is palladium or a compound of palladium.

The platinum group component may be incorporated in the catalytic composite in any suitable manner such a coprecipitation or cogellation, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloroplatinic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium nitrate, palladium sulfate, etc. Hydrogen chloride or the like acid is also generally added to the impregnation solution in order to further facilitate the incorporation of the halogen component and the distribution of the metallic component.

Another essential ingredient of the type of catalysts regenerated by the present method is a halogen component. Although the precise form of the chemistry of the association of the halogen component with the carrier material is not entirely known, it is customary in the art to refer to the halogen component as being combined with the carrier material, or with the other ingredients of the catalyst as the halide (e.g. or combined chloride or fluoride). This combined halogen may be either fluorine, chlorine, iodine, bromine, or mixtures thereof. Of these, fluorine and particularly chlorine are preferred for the purposes of the present invention. The halogen may be added to the carrier material in any suitable manner either during preparation of the support or before or after the addition of the other components. For example, the halogen may be added at any stage of the preparation of the carrier material or to the calcined carrier material, as an aqueous solution of a suitable water-soluble, decomposable halogen-containing compound such as hydrogen fluoride, hydrogen chloride, hydrogen bromide, ammonium chloride, etc. The halogen component or a portion thereof may be combined with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5 wt. % and preferably about 0.5 to about 1.5 wt. % of halogen calculated on a carbonaceous material-free and elemental basis. In isomerization or hydrocracking embodiments, it is generally preferred to utilize relatively larger amounts of halogen in the catalyst — typically ranging up to about 10 wt. % halogen calculated on the same basis, and more preferably about 1 to about 5 wt. %.

After impregnation of the catalytic components into the porous carrier material, the resulting composite is, in the preferred method of preparing this type of bimetallic catalyst, typically subjected to a conventional drying step at a temperature of about 200° F. to about 600° F. for a period of about 1 to 24 hours. Thereafter, the dried composite is typically calcined or oxidized at a temperature of about 700° F. to about 1100° F. in an air stream for a period of about 0.5 to about 10 hours. Moreover, conventional prereduction, halogen adjustment and presulfiding treatments are typically performed in the preparation of catalytic composites which can be regenerated by the method of the present invention. In fact, it is preferred to incorporate about 0.01 to about 0.5 wt. % of sulfur component into the subject catalyst by a conventional presulfiding step.

In a preferred embodiment, the catalyst regenerated by the present invention is a combination of a platinum component, a chlorine component, and a Group IVA metallic component with an alumina carrier material. These components are preferably present in amounts sufficient to result in the catalyst containing, on a carbonaceous material-free and elemental basis, about 0.1 to 3.5 wt. % chlorine, about 0.01 to about 2 wt. % platinum and about 0.01 to about 5 wt. % Group IVA metal. In the case where the Group IVA metallic component is tin, this catalyst preferably contains 0.05 to about 2 wt. % tin. Likewise, when the Group IVA metallic component is germanium, the amount of germanium is preferably about 0.01 to about 5 wt. % thereof.

The principal utility for this type of bimetallic catalyst is in a hydrocarbon conversion process where a dual-function hydrocarbon conversion catalyst having a hydrogenation-dehydrogenation function and an acid-acting function has been traditionally used; for example, these catalysts are used in a catalytic reforming process, with excellent results. In a typical reforming process, a hydrocarbon charge stock boiling in the gasoline range and hydrogen are contacted with the catalyst of the type described above in a conversion zone at reforming conditions. The hydrocarbon charge stock will typically comprise hydrocarbon fractions containing naphthenes and paraffins that boil within the gasoline range. The preferred class of charge stocks include straight run gasolines, natural gasolines, synthetic gasolines, etc. The gasoline charge stock may be a full boiling range gasoline having an initial boiling point of about 50° to about 150° F., and an end boiling point within the range of about 325° to 425° F., or it may be a selective fraction thereof which generally will be a higher boiling fraction commonly referred to as a heavy naphtha — for example, a naphtha boiling in the range of $C_7°$ to 400° F. provides an excellent charge stock. In general, the conditions used in the reforming process are: a pressure of about 0 to about 1000 psig. with the preferred pressure being 100 to about 600 psig., a temperature of about 800° to about 1100° F. and preferably about 900° to about 1050° F., a hydrogen to hydrocarbon mole ratio of about 1 to about 20 moles of $H_2$ per mole of hydrocarbon and preferably about 4 to about 10 moles of $H_2$ per mole of hydrocarbon, and a liquid hourly space velocity (which is defined as the equivalent liquid volume flow rate per hour of the hydrocarbon charge stock divided by the volume of the bed of catalyst particles) of about 0.1 to about 10 hr.$^{-1}$, with a value in the range of about 1 to about 3 hr.$^{-1}$ giving best results.

It is preferred to operate the hydrocarbon conversion process using this type of bimetallic catalyst with injection of a halogen or halogen-containing compound into the feed stream thereto in order to maintain the halogen component of the catalyst at a relatively high level. In particular, it is preferred to add about 1 to about 20 wt. ppm., based on the charge stock, of chlorine or chlorine-containing compounds such as the alkyl chlorides to the charge stock to the process either on a continuous or intermittent basis. The exact amount of halogen added to the process in this fashion is usually determined as a function of the amount of water which is continuously entering the conversion zone and numerous techniques are available for developing the proper correlation between water level entering the conversion zone and the precise amount of halogen which must be added to the feed stream in order to maintain the halogen component of the catalyst at the desired level. For a given charge stock and process these correlations are easily developed by experimental methods well known to those skilled in the art. Regardless of how the halogen component of the catalyst is maintained, it is preferred that it be at a relatively high level before the regeneration procedure described herein is commenced. Specifically, the deactivated hydrocarbon conversion catalyst which is subjected to the method of the present invention should contain at least about 0.1 to about 3.5 wt. % of the halogen component, calculated on a carbonaceous material-free and an elemental basis, and, more particularly, about 0.5 to about 1.5 wt. %.

When the bimetallic catalysts of the type described above are employed in the conversion of hydrocarbons, particularly the catalytic reforming process outlined above, the activity, selectivity, and stability of these catalysts are initially quite acceptable. For example, in a reforming process of this type of bimetallic catalyst has several singular advantages, among which are increased $C_5+$ yield, decreased rate of coke laydown on the catalyst, increased hydrogen make, enhanced stability of both $C_5+$ yield and temperature necessary to make octane, and excellent catalyst life before regeneration becomes necessary. However, the gradual accumulation of coke and other deactivating carbonaceous deposits on the catalyst will eventually reduce the activity and selectivity of the catalyst to a level such that regeneration is desirable. Ordinarily, regeneration becomes desirable when about 0.5 to about 15 wt. % or more of carbonaceous deposits have been formed upon the catalyst.

When the performance of the catalyst has decayed to the point where it is desired to regenerate the catalyst, the introduction of the hydrocarbon charge stock into the conversion zone containing the catalyst is stopped and the conversion zone purged of free hydrogen and hydrocarbons with a suitable gas stream. Thereafter, the regeneration method of the present invention is performed either in situ or the catalyst may be unloaded from the conversion zone and regenerated in an off-line facility.

An essential feature of the present regeneration procedure is the presence of halogen or a halogen-containing compound in the gaseous mixture used during the halogen-treating step. Although a halogen gas such as chlorine or bromine may be used for this purpose, it is generally more convenient to employ a halogen-containing compound such as an alkyl halide, which upon exposure to the conditions utilized in these steps is decomposed to form the corresponding hydrogen halide. In addition, the hydrogen halide may be used directly; in fact best results are achieved when a hydrogen halide is used directly in the gaseous mixture. In general, chlorine or chlorine-containing compounds are the preferred additives for use in this halogen treating step, with the other halogens typically giving less satisfactory results. The preferred mode of operation involves use of hydrogen chloride in the gas mixture used in the halogen-treating step regardless of the type of halogen component contained in the catalyst. In fact, an especially preferred procedure involves the injection of an aqueous solution of hydrogen chloride into the gaseous mixture used in the halogen-treating step. The mole ratio of $H_2O$ to halogen in the gaseous mixture employed in this step in the preferred procedure will range from about 2:1 to about 100:1, with a mole ratio of about 2:1 to 20:1 giving the best results. Operation of the halogen treating step in this fashion insures that the halogen component of the regenerated catalyst is adjusted to a value corresponding to 0.7 to 3 wt. % of the catalyst at the end of this step.

It is to be recognized that another essential feature of the subject regeneration method is that the composition of the gas streams used in the various steps thereof are carefully controlled, and the positive requirements for the composition of the gas streams used during the carbon-burning step and the halogen-treating step are given hereinafter in a manner which specifically includes the precise amounts of active ingredients needed and specifically excludes detrimental ingredients. In particular, it is a critical feature of the present invention that the gas streams used during the carbon-burning step and the halogen-treating step are substantially free of compounds of sulfur — particularly, oxides of sulfur and $H_2S$. Quantitatively, this means less than 5 vol. ppm. sulfur and preferably less than 2 vol. ppm. Likewise, it is essential that the hydrogen stream used during the reduction step by substantially free of both water and sulfur compounds such as $H_2S$. That is, less than 10 vol. ppm. in the case of water and less than 5 vol. ppm. in the case of sulfur. It is, therefore, evident that the gas streams used in each of the steps of the present invention may be once-through streams or recycle streams; provided that in this latter case, the recycle streams are carefully controlled to insure that the positive limitations given hereinafter on the contents of the various gas streams are satisfied, and are treated by conventional techniques to insure the absence of detrimental constituents therefrom. Furthermore, it is to be noted that the temperatures and pressures given hereinafter for each of the steps refer to the temperature and pressure of the gas stream used therein just before it contacts the catalyst.

According to the present invention, the first essential step of the regeneration procedure is the carbon-burning step and it involves contacting the deactivated catalyst with a gaseous mixture comprising about 0.2 to about 3 mole % $O_2$, about 0.02 to about 25 mole % $H_2O$, and an inert gas such as nitrogen, helium, carbon dioxide, etc., or mixtures of these. In a preferred mode of operation, the gaseous mixture used in this step contains about 0.5 to about 2 mole % $O_2$, about 0.1 to about 10 mole % $H_2O$ and an inert gas. The combustion conditions utilized in this step are: a temperature of about 350° to 500° C., with best results obtained at a temperature of about 375° to about 475° C., a pressure sufficient to maintain the flow of the first gaseous mixture through the zone containing the deactivated catalyst, such as a pressure of about 1 to 35 atmospheres and preferably about 1 to about 7 atmospheres, and a gas hourly space velocity (defined as the volume rate of the flow of the gas stream per hour at standard conditions divided by the volume of the bed of catalyst particles) of about 100 to about 25,000 hr.$^{-1}$, with a preferred value of about 3,000 to about 7,000 hr.$^{-1}$. This carbon-burning step is performed for a period sufficient to substantially remove carbonaceous materials from the catalyst. In general, depending obviously upon the amount of carbonaceous material present on the catalyst, a first period of about 1 to about 30 or more hours is adequate in most cases, with best results usually obtained in about 2 to 10 or more hours. Ordinarily, this step is terminated when the differential temperature across the zone containing the catalyst is less than 1° C. for a period of about 0.5 to 5 hours.

The second essential step of the present regeneration method is the halogen treating step and involves subjecting the catalyst resulting from the carbon-burning step, to contact with a gaseous mixture comprising about 4 to about 25 mole % $O_2$, about 1 to about 30 mole % $H_2O$, about 0.05 to about 5 mole % of a halogen or a halogen-containing compound and an inert gas which is typically nitrogen. The temperature utilized in this step is preferably at least 25° C. higher than that used in the carbon-burning step, with best results obtained at higher temperatures of about 500° to 550° C. The other conditions utilized in this step are preferably the same as used in the carbon-burning step. The duration of this step is at least about 0.5 to about 10 hours, with excellent results usually obtained in about 1 to about 5 hours. In a preferred mode of operation, the gaseous mixture used in this step contains a markedly larger amount of oxygen than in the carbon-burning step; more specifically it comprises about 15 to about 25 mole % $O_2$, about 0.1 to about 10 mole %. $H_2O$, about 1 to about 4 mole % halogen or a halogen-containing compound and an inert gas. An especially preferred embodiment of this step involves the use of a temperature of about 500° to about 510° C. and a pressure of about 1 to about 7 atmospheres for a contact time of about 1 to about 2 hours. The function of this halogen-treating step is to insure that halogen content of the catalyst is adjusted to a high level before the reduction step is performed and also to redistribute the metallic components of the catalyst.

After the halogen-treating step is performed on the catalyst, nitrogen or another inert gas is used to displace oxygen and water therefrom. This purge step is performed for a period of time which can be easily determined by monitoring the effluent gases from the zone containing the catalyst to determine when they are substantially free of oxygen and water (i.e., preferably less than 10 vol. ppm. of $H_2O$ and less than 5 vol. ppm. $O_2$). This step is preferably performed at a relatively high temperature; for example, 300° 600° C., with a preferred range being 450° to 500° C. In a preferred embodiment of this purge step, water is first purged from the contact with the catalyst with a dry air stream and then an oxygen-free inert gas is used to remove free oxygen.

Following this purge step, the final essential step of the present invention is commenced. It involves contacting the resulting dried catalyst with a substantially water-free and sulfur compound-free hydrogen stream at a temperature of about 400° to about 600° C. for a final period of at least about 0.5 to about 5 hours. The preferred conditions for this step are a temperature of 450° to 550° C. for a period of at least about 0.5 to about 2 hours. Once again, the pressure and gaseous flow rates utilized in this step are preferably identical to those reported in conjunction with the discussion of the carbon-burning step. The purpose of this reduction step is to reduce the metallic components of the catalyst essentially to an elemental state and to produce a regenerated catalyst having activity, selectivity, and stability characteristics comparable to those possessed initially by the fresh bimetallic catalyst.

In many cases it is advantageous to subject the regenerated catalyst obtained from the reduction step to an additional sulfiding treatment step before it is returned to hydrocarbon conversion service. Although any method known to the art for sulfiding a catalyst can be utilized, the preferred procedure involves contacting a suitable sulfide-producing compound with the reduced catalyst at a temperature of about 20° to 550° C. for a period sufficient to incorporate about 0.01 to about 0.5 wt. % sulfur. The sulfide-producing compound utilized may be selected from the volatile sulfides, the mercaptans, the disulfides and the like compounds; however, best results are ordinarily obtained with hydrogen sulfide. The hydrogen sulfide may be utilized by itself or in admixture with a suitable carrier gas such as hydrogen, nitrogen or the like. Good results have been obtained at a temperature of 375° C. and a pressure of 100 psig. with a mixture of $H_2$ and $H_2S$.

Following this reduction step, or the optional sulfiding step, the hydrocarbon conversion process in which the bimetallic catalyst is utilized may be restarted by once again charging the hydrocarbon stream in the presence of hydrogen to the zone containing the catalyst at reaction conditions designed to produce the desired product. In the preferred case, this involves reestablishing reforming conditions within the zone containing the catalyst.

The following working example is given to illustrate further the regeneration method of the present invention. It is intended to be illustrative rather than restrictive.

EXAMPLE

A deactivated bimetallic catalyst, containing, on a carbonaceous material-free and elemental basis, about 0.6 wt. % platinum, about 0.5 wt. % tin and about 0.9 wt. % chlorine, is analyzed and found to contain about 15 wt. % carbonaceous materials. The deactivated catalyst is then regenerated according to the four-step method of the present invention.

In the carbon-burning step, a first gaseous mixture comprising about 0.6 mole % $O_2$, about 7.5 mole % $H_2O$ and nitrogen is contacted with the deactivated catalyst at combustion conditions. The gaseous mixture contains less than 2 vol. ppm. of sulfur compounds. The combustion conditions utilized are a temperature of 440° C., a pressure of 80 psig. and a gas hourly space velocity (GHSV) of 4800 hr.$^{-1}$. This step is continued until the differential temperature across the zone containing the catalyst is essentially zero for 1 hour. The gaseous mixture is supplied on a once-through basis.

After the carbon-burning step, the resulting catalyst is then contacted with a second gaseous mixture comprising 19.3 mole % $O_2$, 6 mole % $H_2O$, 3 mole % HCl and nitrogen at treating conditions, including a temperature of 510° C., a pressure of 80 psig. and a GHSV of 4800 hr.$^{-1}$, for a period of 1 hour. The second gaseous mixture is supplied on a once-through basis and contains less than 2 vol. ppm. of sulfur compounds.

The resulting halogen-treated catalyst is then subjected to a drying step with an air stream containing less than 5 vol. ppm. $H_2O$ at a temperature of about 500° C. until the effluent gas stream from the zone containing the catalyst contains less than 5 vol. ppm. $H_2O$. Thereafter, residual free oxygen is purged from contact from the catalyst with an $H_2O$- and $O_2$-free nitrogen stream until the effluent gas stream shows less than 1 vol. ppm. $O_2$.

The resulting dried catalyst is then contacted with a hydrogen stream at reduction conditions, including a temperature of about 510° C., a 400 hr.$^{-1}$ GHSV, and a pressure of about 80 psig., for a period of about 2 hours. The hydrogen stream utilized contains less than 10 vol. ppm. $H_2O$ and less than 2 vol. ppm. of sulfur compounds. It is used on an once-through basis.

The resulting regenerated catalyst recovered from the reduction step is found to have essentially the same activity, selectivity and stability characteristics as the fresh catalyst.

It is within the scope of the present invention to apply the regeneration procedure disclosed herein to other types of bimetallic catalysts that have properties and problems which are analogous to those associated with the bimetallic catalyst described hereinbefore. A case in point involves a trimetallic catalyst comprising a combination of catalytically effective amounts of a platinum group component, a rhenium component, a Group IVA metallic component (i.e. a component selected from the group consisting of tin, germanium, lead and compounds thereof) and a halogen component with a porous carrier material. More specifically, the regeneration of a carbon-deactivated trimetallic catalyst of this last type can be accomplished by means of the procedure of the present invention.

It is intended to cover, by the following claims, all changes and modifications of the above disclosure of the present invention that would be self-evident to a man of ordinary skill in the catalyst regeneration art.

I claim as my invention:

1. A method for regenerating a deactivated hydrocarbon conversion catalyst combination of about 0.01 to about 2 wt. % of a platinum group component, about 0.01 to about 5 wt. % of a Group IVA metallic component and about 0.1 to about 10 wt. % of a halogen component with a porous refractory inorganic oxide carrier material, the catalyst having been deactivated by deposition of carbonaceous materials thereon during a previous contacting with a hydrocarbon charge stock at an elevated temperature, said method comprising the steps of:

a. contacting the deactivated catalyst with a substantially sulfur compound-free gaseous mixture consisting essentially of about 0.2 to about 3 mole % $O_2$, about 0.02 to about 25 mole % $H_2O$ and an inert gas at combustion conditions, including a pressure sufficient to maintain flow of said mixture through the catalyst and a temperature of about 350° to about 500°C., for a first period sufficient to substantially remove said carbonaceous materials;

b. subjecting the catalyst resulting from step (a) to contact with a substantially sulfur compound-free gaseous mixture consisting essentially of about 4 to about 25 mole % $O_2$, about 1 to about 30 mole % $H_2O$, about 0.05 to about 5 mole % of halogen-containing compound and an inert gas at halogen treating conditions, including a temperature in the range of from about 500°C. to about 550°C. and at least about 25°C. higher than that utilized in step (a) and a pressure sufficient to maintain flow of said mixture through the catalyst, for a second period of at least about 0.5 to about 10 hours, the mole ratio of $H_2O$ to halogen in the last-named gaseous mixture being in the range of about 2:1 to 100:1;

c. purging oxygen and water from contact with the catalyst resulting from step (b) with a gas stream; and d. subjecting the catalyst resulting from step (c) to contact with a substantially water-free and sulfur compound-free hydrogen stream at reduction conditions, including a temperature of about 400° to about 600°C. and a pressure sufficient to maintain flow of the hydrogen stream through the catalyst, for a final period of at least about 0.5 to about 5 hours, thereby producing a regenerated hydrocarbon conversion catalyst.

2. A method as defined in claim 1 wherein the platinum group component of the catalyst is platinum.

3. A method as defined in claim 1 wherein the platinum group component of the catalyst is palladium.

4. A method as defined in claim 1 wherein the halogen component of the catalyst is combined chloride.

5. A method as defined in claim 1 wherein the halogen component of the catalyst is combined fluoride.

6. A method as defined in claim 1 wherein the Group IVA metallic component of the catalyst is tin.

7. A method as defined in claim 1 wherein the Group IVA metallic component of the catalyst is germanium.

8. A method as defined in claim 1 wherein the Group IVA metallic component of the catalyst is lead.

9. A method as defined in claim 1 wherein the porous carrier material is alumina.

10. A method as defined in claim 1 wherein the porous carrier material is gamma- or eta-alumina.

11. A method as defined in claim 1 wherein the deactivated catalyst contains, on a cabonaceous material-free and elemental basis, about 0.1 to about 3.5 wt. % halogen.

12. A method as defined in claim 1 wherein the deactivated catalyst is a combination of the platinum component, a chlorine component and a tin or germanium component with an alumina carrier material in amounts sufficient to result in a catalyst containing, on a carbonaceous material-free and elemental basis, about 0.1 to about 3.5 wt. % chlorine, about 0.01 to about 2 wt. % platinum and about 0.01 to about 5 wt. % germanium or tin.

13. A method as defined in claim 1 wherein the halogen component of the deactivated catalyst is combined chloride and the halogen or halogen-containing compound utilized in step (b) is chlorine or hydrogen chloride.

14. A method as defined in claim 1 wherein the gaseous mixture utilized in step (a) consists essentially of about 0.5 to about 2 mole % oxygen, about 0.1 to about 10 mole % $H_2O$ and an inert gas.

15. A method as defined in claim 1 wherein the gaseous mixture utilized in step (b) consists essentially of about 15 to 25 mole % $O_2$, about 1 to about 10 mole % $H_2O$, about 1 to about 4 mole % of a halogen or a halogen-containing compound, and an inert gas.

16. A method as defined in claim 1 having the additional step of sulfiding the catalyst resulting from step (d) by contacting same at a temperature of about 20° to 550° C. with a sulfide-producing compound in an amount sufficient to result in a regenerated catalyst containing about 0.01 to about 0.5 wt. % sulfur.

17. A method as defined in claim 16 wherein the sulfide-producing compound is $H_2S$.

18. A method as defined in claim 1 wherein the combustion conditions utilized in step (a) include a temperature of about 375° to about 475° C.

19. A method as defined in claim 1 wherein the reduction conditions utilized in step (d) include a temperature of about 450° to about 550° C.

* * * * *